United States Patent
Prior et al.

(10) Patent No.: US 6,303,221 B1
(45) Date of Patent: Oct. 16, 2001

(54) TWO-COMPONENT PULP REINFORCEMENT

(75) Inventors: David White Prior, Midlothian, VA (US); Michael R. Truby, Franklin, TN (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/731,556

(22) Filed: Dec. 7, 2000

(51) Int. Cl.$^7$ ........................................ D02G 3/00
(52) U.S. Cl. .................. 428/401; 428/395; 428/397; 428/423.5; 428/423.7; 428/458; 428/364
(58) Field of Search ...................... 428/364, 392, 428/373, 401, 423.5, 403.7, 458, 473.5, 395, 397, 295.1

(56) References Cited

U.S. PATENT DOCUMENTS

| | | |
|---|---|---|
| 5,073,440 | 12/1991 | Lee . |
| 5,094,913 * | 3/1992 | Yang ..................................... 428/364 |
| 5,205,970 * | 4/1993 | Kafka ..................................... 264/101 |
| 5,205,972 * | 4/1993 | Kafka ..................................... 264/101 |
| 5,205,973 | 4/1993 | Kafka . |
| 5,576,104 | 11/1996 | Causa et al. . |
| 5,830,395 * | 11/1998 | Vercesi et al. ......................... 264/101 |

FOREIGN PATENT DOCUMENTS

| | | |
|---|---|---|
| 53-111120 | 9/1978 | (JP) . |
| 59-163418 | 9/1984 | (JP) . |
| S61-57346 | 12/1986 | (JP) . |

* cited by examiner

*Primary Examiner*—Merrick Dixon

(57) ABSTRACT

The present invention relates to a high modulus elastomer composition reinforced by pulp having a high surface area and composed of a combination of at least two organic polymeric materials.

7 Claims, No Drawings

TWO-COMPONENT PULP REINFORCEMENT

BACKGROUND OF THE INVENTION

1. Field of the Invention

This invention relates to pulp reinforcement of polymer compositions as a means for increasing the tensile moduli of such compositions. The pulp of this invention is a special, two-component, material.

2. Description of Related Art

U.S. Pat. No. 5,830,395, issued Nov. 3, 1998 on the application of G. Vercesi et al., discloses the manufacture of a composition with a pulp uniformly dispersed in a polymer. The pulp is a single-component material.

Research Disclosures 329110 and 330093, published September and October, 1991, respectively, disclose the use of aramid pulp as a reinforcement for elastomer materials.

Japanese Patent Publication Kokai No. 59-163418, published Sep. 14, 1984, discloses fibers comprising 80–99 weight percent poly(p-phenylene terephthalamide) and 1–20 weight percent aliphatic polyamide. The fibers are pulped and used in paper and possibly other applications.

U.S. Pat. No. 5,094,913, issued Mar. 10, 1992, discloses two-component pulp that can be used as reinforcement in polymer compositions.

Japanese Patent Publication Kokai No. 53-111120, published Sep. 28, 1978, discloses fibrids that may be a blended combination of para-aramid and a second polymer, useful, among other things, as a paper component and as reinforcement for rubber tires.

BRIEF SUMMARY OF THE INVENTION

This invention relates to a fibrous reinforcing composition comprising 20 to 99 weight percent elastomer and 1 to 80 weight percent fibrous, polymeric, pulp uniformly combined therewith, wherein the fibrous pulp is a combination of at least two organic polymeric materials and has a surface area of greater than 6 m$^2$/g (square meters per gram).

In one aspect of the invention, the components of the pulp are soluble and mutually immiscible in sulfuric acid and the pulp can be a refined fiber floc.

DETAILED DESCRIPTION OF THE INVENTION

There is and has long been a need for elastomer reinforcement that will increase the tensile modulus of articles made using the elastomer. This invention is devoted to that need.

Polymer moduli have been increased in the past by addition of various additives to the polymer. Particles, such as carbon black or silicon dioxide, have been used as reinforcement for rubber to achieve an increased modulus, as have fibrous materials such as pulp.

The present invention aims to further increase elastomer modulus by addition of a pulp to the elastomer. The pulp, however, is a form with qualities especially adapted to dispersion in an elastomer and to increasing adhesion to an elastomer. The pulp of this invention has particularly high surface area and is made from a combination of at least two organic polymeric materials.

Fibrous polymeric pulps of the present invention can be made by refining a floc of fibers made from the desired component polymeric materials; and the floc can be made by cutting fibers that have been spun from a blend of the component polymeric materials. The most usually used pulp for this invention is a pulp that is primarily para-aramid. The para-aramid can be spun from a solution of sulfuric acid; and any other component materials must, in that case, be soluble and stable in sulfuric acid.

By "para-aramid" is meant a polyamide wherein at least 85% of the amide (—CO—NH—) linkages are attached directly, at para-orientation, to two aromatic rings.

Additives can be used with the para-aramid and it has been found that up to as much as 10 percent, by weight, of other polymeric material can be blended with the para-aramid or that copolymers can be used having as much as 10 percent of other diamine substituted for the diamine of the para-aramid or as much as 10 percent of other diacid chloride substituted for the diacid chloride of the para-aramid. Poly (p-phenylene terephthalamide) (PPD-T) is the preferred para-aramid for practice of this invention. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride; provided, only that the other aromatic diamines and aromatic diacid chlorides be present in amounts which permit preparation of anisotropic spin dopes. Preparation of PPD-T is described in U.S. Pat. Nos. 3,869,429; 4,308,374; and 4,698,414.

Examples of polymeric materials that can be used in the pulp of this invention include: para-aramids and copolymers as set out above, cycloaliphatic polyamides and aliphatic polyamides such as nylon 6 and nylon 66, poly(vinyl pyrrolidone), meta-aramids such as poly(m-phenylene isophthalamide) and copolymers, and the like.

The pulp used in this invention is, as stated, of high surface area; and that high surface area is achieved during the process wherein floc of fibers of the combination of polymers is refined to make a pulp. The fibers and the resulting pulp must be made from at least two component polymeric materials and the component polymeric materials must be mutually immiscible so that the polymeric materials will be present in the fibers in closely-mixed but separate solid phases. The fibers of closely-mixed but separate solid phases, when refined to a pulp, yield pulp particles with domains of two distinct polymeric materials;—one phase being the continuous, primary, polymer phase, usually the para-aramid polymer, and the other phase being the discontinuous, secondary, polymer phase, usually the other polymer component in the combination.

The primary polymer is, as stated, a continuous polymer phase in the fibers and in the fibrous pulp after refining. In the make-up of the pulp compositions, the primary polymer represents 65 to 97 weight percent of the total composition. The secondary polymer represents 3 to 35 weight percent of the total composition, is present as a discontinuous polymer phase in the fibers, and is concentrated at the outer surfaces of the fibrous pulp after refining.

In the refining process, wherein floc is ground or beaten to break individual fibers into pulp particles, the discontinuous, secondary, polymer is present as small domains of material running through the fibers and serving, in the refining process, as points of disruption in the fiber structure to promote ready and more complete refining into pulp. After the refining, a portion of the discontinuous, secondary, polymer from each disruption point is present on or at the surface of each pulp particle that results from the refining process.

Pulp refined from floc that is made from a single polymeric material or from a miscible blend of polymeric materials that does not have the domains of discontinuous secondary polymer, will not have such a high surface area or, if refined enough to have such a high surface area, will have it because the pulp particles are smaller with a lower aspect ratio and are, therefore, not as useful.

One important quality of the two-component pulp used in this invention, is the surface area or specific surface area of the pulp. As stated elsewhere herein, floc of fibers made from the two-component blend of polymeric materials is readily refined into high surface area pulp by virtue of fracture points provided by the presence of domains of the discontinuous second polymer. High surface area is important because the surface area provides an indication of the extent of fibrillation of the floc fibers. A large surface area (and, therefore, a high degree of fibrillation) means that the pulp will have more contact with the matrix polymer materials and, therefore, will have an increased effect on the qualities of the matrix polymer materials. The pulp of this composition should have a specific surface area of at least 6 $m^2/g$—at least 8 $m^2/g$ is preferred and at least 10 $m^2/g$ is more preferred.

Other than in the use of the immiscible combination of at least two polymeric materials in the fibers, making the pulp of this invention is much the same as making pulp from fibers of a single phase of polymeric material. The fibers of two-component materials are spun in the same way as single component fibers are spun. For fibers having para-aramid as the primary component, the well-known, so-called, air gap spinning is preferred, such as is taught in aforementioned U.S. Pat. No. 5,094,913. Refining the two-component fibers generally requires less energy than refining single-component fibers because, as previously explained, the two-component fibers fibrillate more easily under refining forces.

The pulp of this invention is used to reinforce elastomers to make a composition with a surprisingly high tensile modulus compared with compositions reinforced by other particulate materials, including conventional, one-component, pulps.

The composition of this invention includes from about 1 to 80 weight percent of the fibrous two-component pulp reinforcement material and 20 to 99, or perhaps even higher, weight percent of polymer to be reinforced. The amount of pulp reinforcement material may vary over a wide range depending on the intended end use of the reinforced elastomer. For instance, in uses wherein the reinforced elastomer is rubber, power transmission belts may have as much as 5 to 20 weight percent of the pulp while tires may have as little as 0.5 to 5 weight percent pulp. Also, the composition of this invention can be used with a very high concentration of pulp—such as 50 to 80 weight percent—as a "concentrate" material for use in the manufacture of additional elastomer blends by facilitating dispersion of the pulp.

Examples of elastomers that can be reinforced by the pulp of this invention are: styrene butadiene rubber (SBR); natural rubber (NR); isoprene rubber; butyl rubber (BR); butadiene rubber, ethylene propylene diene copolymer (EPDM); polychloroprene (CR); nitrile rubber (NBR); hydrogenated nitrile rubber (HNBR); polyurethane; ethylene/octylene copolymer; elastomeric ethylene acrylic copolymer; fluoroelastomer; silicone rubber; and the like.

The two-component pulp of this invention is combined with the elastomer to be reinforced by any means that will yield an intimate, substantially homogeneous, mixture of pulp and elastomer. One preferred method for combining pulp and elastomer is to blend the pulp with the elastomer in an extruder in accordance with the teaching of U.S. Pat. No. 5,830,395. The method of that patent includes introducing moist pulp to an extruder, drying the pulp in the extruder, introducing polymer into the extruder to mix with the dried pulp, and expelling a substantially uniform pulp and polymer composition from the extruder. A preferred method for combining pulp and elastomer is to blend the pulp with a latex of the elastomer in an extruder in accordance with the teaching of U.S. Pat. Nos. 5,205,972 and 5,205,973. The method of those patents includes blending moist pulp and a latex of the elastomer in an extruder, coagulating the latex in the extruder, dewatering the blend, evaporating the remaining water and discharging the pulp and elastomer composition from the extruder.

Other means for combining the pulp and the elastomer include; dispersing dry pulp in a solvent solution of the elastomer and evaporating the solvent; mixing dry pulp with a liquid elastomer; mixing the pulp with an aqueous emulsion of the elastomer and evaporating the water; and the like. The process for accomplishing the combination is not important so long as the product is a substantially uniform dispersion of pulp and polymer.

TEST METHODS

Elastomer Tensile Properties

Properties are determined using ASTM D412-98a with Test Method A, and Die C. Modulus values determined by this test are termed tensile stress at-given-elongation and represent the stress required to stretch the uniform cross section of a test specimen to a given elongation. The Die C yields dumbbell specimens with a reduced section less than 25 millimeters wide and about 2 millimeters thick. A specimen gage length of 50 centimeters and a cross head speed of 50 centimeters per minute are used. Values are reported for the several elongations listed in the Examples.

Fiber Length

Fiber length is measured using a Kajaani FS-200 instrument (Kajaani Electronics, Kajaani, Finland). An aqueous slurry of fibers is prepared at a concentration adequate for a rate of analysis of 40–60 fibers per second. The slurry is passed through the capillary of the instrument for exposure to a laser beam and a detector to determine the fiber length. The instrument performs calculations from the detector output and reports three different lengths;—the arithmetic average length, the length-weighted average length; and the weight-weighted average length.

Specific Surface Area

Surface areas are determined utilizing a single point BET nitrogen absorption method using a Strohlein surface area meter (Standard Instrumentation, Inc., Charleston, W.Va.). Washed samples of pulp are dried in a tared sample flask, weighed and placed on the apparatus. Nitrogen is adsorbed at liquid nitrogen temperature. Adsorption is measured by the pressure difference between sample and reference flasks (manometer readings) and specific surface area is calculated from the manometer readings, the barometric pressure, and the sample weight.

EXAMPLES

A composition of this invention includes pulp made from floc that has been cut from continuous fibers made with a combination of polymers. The fibers for the floc can be spun from solutions of the desired combination of polymers. Continuous fibers of these examples were spun from solutions containing poly(p-phenylene terephthalamide) (PPD-T) and at least one of the following: poly(vinyl pyrrolidone) (PVP); Nylon 6,6; and poly(m-phenylene isophthalamide) (MPD-I) using air gap spinning from concentrated sulfuric acid such as is described in U.S. Pat. No. 5,094,913.

Floc fibers were cut from those continuous fibers and the floc was fed to a 30 centimeter laboratory refiner made by Sprout-Bauer. The floc fibers were 1.5 denier in linear density and 0.64 cm in length and were fed as a slurry of 1.5 weight percent in water. The fibers were refined to a pulp by multiple passes through the refiner at various plate gap settings. After refining, the resulting pulp product was pumped to a filter bag and dewatered to a solids content of about 8–16 weight percent solids; and pulp characteristics were determined. Those pulp characteristics are shown in Table I.

To make a fiber-matrix concentrate used to make the composition of this invention and the control compositions, the pulp was first combined with an elastomer. To make the composition for these examples, that combination was accomplished as follows: About 400 weight parts of an aqueous mass of about 10 weight percent pulp were dispersed in about 3000 weight parts of water using vigorous, high shear, agitation. About 25 weight parts of a 12 weight percent solution and 3 weight parts of a 20 weight percent solution of Alcogum 6940 and Alcogum SL-76, respectively, sold by Alco Chemical Company, were added to the pulp dispersion, as rheology modifiers. An amount of elastomer latex was added to provide 133 parts of dry weight rubber to the blend. For example, about 700 parts of a 19 weight percent styrene butadiene rubber latex or about 222 parts of 60 weight percent natural rubber latex, with the latex amounts depending on the latex concentration. To this mixture, 100 weight parts of a coagulant were added. The coagulant was an aqueous solution of 5 weight percent acetic acid and 25 weight percent calcium chloride. The pulp and elastomer coagulated together and the coagulated mass was dewatererd in a hand-driven mechanical press and then dried.

To determine effectiveness of the compositions of this invention, the concentrates described above were blended with an elastomer and the blends were tested. The blending was conducted in a two-stage process using a Banbury mixer and a 2-roll rubber mill. The ingredients for each elastomer matrix exemplified are individually presented in tables set out below; but it must be understood that these recipes are generally-used formulations representing only a few of a vast array of such elastomer formulations improved by the composition of this invention. In the first stage of the process, the Banbury mixer was turned on and charged, in order, with ½ of the elastomer, the pulp concentrate, and ½ of the elastomer. After about one minute, the zinc oxide and ½ of the carbon black were added; and after another 1½ minutes, all remaining ingredients except the curing materials were added. After about 4 more minutes, the mass was transferred to the 2-roll rubber mill where it was run with three cuts to each side and three end passes before sheeting off.

In the second stage of the process, the operating Banbury mixer was charged, in order, with ½ of the first stage product, the curing materials, and ½ of the first stage product. After about two minutes, the mass was transferred

TABLE I

Pulp Components and Characteristics

| CODE | 2ND POLYMER TYPE | WT % | Area m²/g | KAJAANI LENGTH, mm AR* | LWT* | WWT* | <0.2 min P* |
|------|------|------|------|------|------|------|------|
| A | NONE | 0 | 8.30 | 0.16 | 0.62 | 1.69 | 76.3 |
| B | NONE | 0 | 9.0 | 0.18 | 0.62 | 1.41 | 72.7 |
| C | PVP | 10.7 | 13.9 | 0.22 | 0.69 | 2.04 | 60.6 |
| D | PVP | 10.7 | 21.2 | 0.22 | 0.57 | 1.28 | 60.4 |
| E | 6,6 NYLON | 10 | 11.9 | 0.24 | 0.65 | 1.47 | 58.7 |
| F | 6,6 NYLON | 10 | 19.5 | 0.23 | 0.60 | 1.44 | 59.1 |
| G | MPDI | 10 | 9.7 | 0.22 | 0.80 | 2.34 | 62.9 |
| H | MPDI | 10 | 18.9 | 0.22 | 0.59 | 1.39 | 61.7 |
| I | PVP | 20 | 21.9 | 0.26 | 0.64 | 1.48 | 54.4 |
| J | PVP | 3.7 | 10.4 | 0.21 | 0.92 | 2.86 | 68.8 |
| K | PVP | 20 | 18.3 | 0.29 | 0.74 | 1.62 | 48.2 |
| L | PVP | 16.7 | 22.0 | 0.24 | 0.61 | 1.36 | 56.2 |
| M | PVP | 10.7 | 8.8 | 0.24 | 0.81 | 2.67 | 59.7 |
| N | PVP | 10.7 | 19.5 | 0.23 | 0.67 | 1.62 | 59.5 |
| O | PVP | 16.7 | 16.6 | 0.26 | 0.72 | 1.73 | 54.8 |
| P | PVP | 20 | 12.3 | 0.24 | 0.65 | 1.69 | 57.3 |
| Q | PVP | 16.7 | 10.5 | 0.27 | 0.83 | 2.53 | 53.9 |
| R | PVP | 3.7 | 17.3 | 0.16 | 0.41 | 0.84 | 72.2 |
| S | PVP | 10.7 | 14.5 | 0.24 | 0.69 | 1.89 | 58.7 |
| T | MPDI | 5 | 9.5 | 0.24 | 0.90 | 2.58 | 63.0 |
| U | MPDI | 5 | 14.1 | 0.23 | 0.68 | 1.67 | 60.3 |
| V | MPDI | 10 | 10.8 | 0.26 | 0.78 | 2.14 | 56.5 |
| W | MPDI | 10 | 20.2 | 0.25 | 0.65 | 1.40 | 56.0 |
| ZZ | NO FIBER CONTROL | | | | | | |

*AR = Arithmetic Average Length
*LWT = Length-Weighted Average Length
*WWT = Weight-Weighted Average Length
*P = Percentage of fibers below 0.2 mm in the material.

to the 2-roll rubber mill where it was run with five cuts to each side and three end passes before sheeting off.

Each of the compositions was blended in accordance with the above procedure to make a pulp reinforced elastomeric material. The resulting elastomeric material was tested for tensile modulus to determine the differences between elastomeric material reinforced by pulp in the composition of this invention and elastomeric material reinforced by other pulp or no pulp.

Detailed explanations of the Examples, divided into Example Groups, are set out below:

Examples 1–9

In these examples, a variety of pulps were combined with nitrile butadiene rubber (NBR) to make compositions of this invention. Initially, the pulps were compounded as a concentrate at a concentration of 30 parts of pulp in 100 parts of NBR. The concentrate was compounded at a concentration of 13 parts of the concentrate in 90 parts of NBR. The ultimate composition was evaluated against a control by compounding it at a concentration of 3 weight parts pulp in every 100 weight parts of elastomer and determining the tensile modulus of the composition material at several elongations. The elastomer matrix for these examples is shown in Table II.

TABLE II

| Ingredient | Function | Parts (wt) |
| --- | --- | --- |
| NBR | NBR rubber | 90 |
| Pulp Concentrate | Fiber reinforcement | 13 |
| Zinc Oxide | Activator | 5 |
| Stearic Acid | Process aid | 5 |
| Agerite Resin D | Stabilizer | 2 |
| Durex 12687 | Activator | 2 |
| HiSil 233 | Silica Reinforcement | 45 |
| Titanium Dioxide | Pigment | 5 |
| Sulfur | Curative | 1.5 |
| Altax | Curative | 1 |
| Diethylene Glycol | Accelerator | 1 |

Table III identifies the pulp by additive quantity and surface area and reports the tensile modulus for the several compositions. It can be noted that the compounded compositions of this invention unfailingly exhibit tensile moduli that are significantly higher than moduli of the control.

TABLE III

| Code | Example No. | 2nd polymer (wt %) | Surface Area (m²/g) | Moduli (psi) at % Elongation | | | |
| --- | --- | --- | --- | --- | --- | --- | --- |
| | | | | 10 | 30 | 50 | 100 |
| A | 1C | None | 8.3 | 413 | 810 | 1003 | 1228 |
| B | 2C | None | 9.0 | 367 | 747 | 940 | 1161 |
| C | 3 | PVP | 13.9 | 591 | 1072 | 1316 | 1629 |
| D | 4 | (10.7) | 21.2 | 713 | 1065 | 1249 | 1490 |
| E | 5 | Nyl 6,6 | 11.9 | 723 | 1447 | 1825 | 2258 |
| F | 6 | (10) | 19.5 | 873 | 1307 | 1516 | 1767 |
| G | 7 | MPD-I | 9.7 | 650 | 1183 | 1454 | 1803 |
| H | 8 | (10) | 18.9 | 567 | 973 | 1175 | 1444 |
| ZZ* | 9 - No pulp | | | 159 | 227 | 258 | 323 |

*ZZ = No fiber reinforcement

Examples 10–18

In these examples, a variety of pulps were combined with natural rubber and styrene butadiene rubber (NR/SBR) to make compositions of this invention. Initially, the pulps were compounded as a concentrate at a concentration of 30 parts of pulp in 100 parts of SBR. That concentrate was then compounded at a concentration of 13 parts of concentrate in 90 parts of a 50/40 blend of NR/SBR. The final elastomer composition was 50/50 NR/SBR. The compositions were evaluated against a control by compounding them at a concentration of 3 parts of pulp in 100 parts of 50/50 NR/SBR and determining the tensile modulus of the compounded material at several elongations. The elastomer matrix for these examples is shown in Table IV.

TABLE IV

| Ingredient | Function | Parts (wt) |
| --- | --- | --- |
| RSS #1 | Natural rubber (dry) | 50 |
| SBR 1502 | SB Rubber (dry) | 40 |
| Pulp Concentrate | Fiber reinforcement | 13 |
| GPT Black (N-299) | Reinforcing agent | 45 |
| Sundex 790 | Process aid | 9 |
| VANWAX H Special | Lubricant | 1 |
| Dustan GPPD | Stabilizer | 2 |
| VANOX 2 | Stabilizer | 1 |
| Zinc Oxide | Activator | 3 |
| Stearic Acid | Process aid | 3 |
| Sulfur | Curative | 1.6 |
| AMAX | Accelerator | 0.8 |
| Accelerator DPG | Accelerator | 0.4 |

Table V identifies the pulp by additive quantity and surface area and reports the tensile modulus for the several compositions. It can be noted that the compounded compositions of this invention unfailingly exhibit tensile moduli that are significantly higher than moduli of the control.

TABLE V

| Code | Example No. | 2nd polymer (wt %) | Surface Area (m²/g) | Moduli (psi) at % Elongation | | | |
| --- | --- | --- | --- | --- | --- | --- | --- |
| | | | | 10 | 30 | 50 | 100 |
| A | 10C | None | 8.3 | 540 | 842 | 888 | 914 |
| B | 11C | None | 9.0 | 460 | 733 | 769 | 790 |
| C | 12 | PVP | 13.9 | 957 | 1238 | 1268 | 1273 |
| D | 13 | (10.7) | 21.2 | 843 | 1218 | 1283 | 1317 |
| E | 14 | Nyl 6,6 | 11.9 | 965 | 1237 | 1275 | 1290 |
| F | 15 | (10) | 19.5 | 1025 | 1273 | 1299 | 1306 |
| G | 16 | MPD-I | 9.7 | 696 | 964 | 1006 | 1034 |
| H | 17 | (10) | 18.9 | 978 | 1224 | 1255 | 1259 |
| ZZ* | 18 - No pulp | | | 74 | 127 | 164 | 263 |

*ZZ = No fiber reinforcement

Examples 19–24

In these examples, a variety of pulps were combined with natural rubber (NR) to make compositions of this invention. Initially, the pulps were compounded as a concentrate at a concentration of 30 parts of pulp in 100 parts of NR. The concentrate was compounded at a concentration of 21.75 parts of the concentrate in 83.25 parts of NR. The ultimate composition was evaluated against a control by compounding it at a concentration of 3 weight parts pulp in every 100 weight parts of elastomer and determining the tensile modulus of the composition material at several elongations. The elastomer matrix for these examples is shown in Table VI.

TABLE VI

| Ingredient | Function | Parts (wt) |
| --- | --- | --- |
| RSS #1 | Natural rubber | 83.25 |
| Pulp Concentrate | Fiber reinforcement | 21.75 |
| Zinc Oxide | Activator | 8 |
| Stearic Acid | Process aid | 1.5 |
| Agerite Resin D | Stabilizer | 1.5 |
| Permanox 6PPD | Stabilizer | 1.5 |
| Circo Light Oil | Process aid | 2 |
| FEF N550 | Carbon black | 30 |
| 80% Insol. Sulfur | Curative | 4.5 |
| BBTS | Accelerator | 1 |

Table VII identifies the pulp by additive quantity and surface area and reports the tensile modulus for the several compositions. It can be noted that the compounded compositions of this invention unfailingly exhibit tensile moduli that are significantly higher than moduli of the control.

TABLE VII

| | | 2nd polymer | Surface Area | Moduli (psi) at % Elongation | | | |
| --- | --- | --- | --- | --- | --- | --- | --- |
| Code | Example No. | (wt %) | ($m^2/g$) | 10 | 30 | 50 | 100 |
| A | 19C | None | 8.3 | 269 | 826 | 983 | 965 |
| B | 20C | None | 9.0 | 403 | 816 | 906 | 909 |
| C | 21 | PVP | 13.9 | 1194 | 1447 | 1462 | 1469 |
| D | 22 | (10.7) | 21.2 | 1649 | 2015 | 1965 | 1920 |
| I | 23 | PVP (20) | 21.9 | 920 | 1836 | 1878 | 1821 |
| ZZ* | 24 - No pulp | | | 35 | 68 | 109 | 183 |

*ZZ = No fiber reinforcement

Examples 25–33

In these examples, a variety of pulps were combined with neoprene to make compositions of this invention. Initially, the pulps were compounded as a concentrate at a concentration of 30 parts of pulp in 100 parts of neoprene. The concentrate was compounded at a concentration of 26 parts of the concentrate in 80 parts of neoprene. The ultimate composition was evaluated against a control by compounding it at a concentration of 6 parts of the pulp in 100 parts of neoprene and determining the tensile modulus of the compounded material at several elongations. The elastomer matrix used for these examples is shown in Table VIII.

TABLE VIII

| Ingredient | Function | Parts (wt) |
| --- | --- | --- |
| Neoprene GRT | Elastomer base | 80 |
| Pulp Concentration | Fiber reinforcement | 26 |
| Stearic Acid | Process aid | 1 |
| Magnesium Oxide | Curative | 4 |
| Agerite Stalate S | Stabilizer | 2 |
| Sundex 790 | Process aid | 10 |
| SRF N774 | Carbon black | 58 |
| Zinc Oxide | Curative | 5 |

Table IX identifies the pulp by additive quantity and surface area and reports the tensile modulus for the several compositions. It can be noted that the compounded compositions of this invention nearly always exhibit tensile moduli that are significantly higher than moduli of the control.

TABLE IX

| | | 2nd polymer | Surface Area | Moduli (psi) at % Elongation | | | |
| --- | --- | --- | --- | --- | --- | --- | --- |
| Code | Example No. | (wt %) | ($m^2/g$) | 10 | 30 | 50 | 100 |
| A | 25C | None | 8.3 | 1583 | 2012 | 1964 | 1885 |
| B | 26C | None | 9.0 | 1402 | 1776 | 1808 | 1797 |
| C | 27 | PVP | 13.9 | 1858 | 2253 | 2276 | — |
| D | 28 | (10.7) | 21.2 | 2080 | 2476 | — | — |
| E | 29 | Nyl 6,6 | 11.9 | 2038 | 2299 | — | — |
| F | 30 | (10) | 19.5 | 1573 | 1885 | 1996 | 2025 |
| G | 31 | MPD-I | 9.7 | 1778 | 1999 | 2028 | 1990 |
| H | 32 | (10) | 18.9 | 1797 | 2206 | 2403 | — |
| ZZ* | 33 - No pulp | | | 96 | 177 | 280 | 555 |

*ZZ = No fiber reinforcement

Examples 34–53

In these examples, a variety of pulps were combined with natural rubber (NR) to make compositions of this invention. Initially, the pulps were compounded as a concentrate at a concentration of 30 parts of pulp in 100 parts of NR. The concentrate was compounded at a concentration of 21.75 parts of the concentrate in 83.25 parts of NR. The ultimate composition was evaluated against a control by compounding it at a concentration of 5 parts of the pulp in 100 parts of NR and determining the tensile modulus of the compounded material at several elongations. The elastomer matrix used for these examples is the same as that used for Examples 19–24.

Table X identifies the pulp by additive quantity and surface area and reports the tensile modulus for the several compositions. It can be noted that the compounded compositions of this invention unfailingly exhibit tensile moduli that are significantly higher than moduli of the control.

TABLE X

| | | 2nd polymer | Surface Area | Moduli (psi) at % Elongation | | | |
| --- | --- | --- | --- | --- | --- | --- | --- |
| Code | Example No. | (wt %) | ($m^2/g$) | 10 | 30 | 50 | 100 |
| B | 34C | None | 9.0 | 393 | 861 | 993 | 1036 |
| J | 35 | PVP (3.7) | 10.4 | 842 | 1170 | 1331 | 1422 |
| K | 36 | (20) | 18.3 | 797 | 1312 | 1643 | 1797 |
| L | 37 | (16.7) | 22.0 | 1173 | 1594 | 1772 | — |
| M | 38 | (10.7) | 8.8 | 1377 | 1480 | 1466 | 1396 |
| I | 39 | (20) | 21.9 | 884 | 1528 | 1762 | — |
| N | 40 | (10.7) | 19.5 | 696 | 964 | 1006 | 1034 |
| K | 41 | (20) | 18.3 | 978 | 1224 | 1255 | 1259 |
| O | 42 | (16.7) | 16.6 | 1388 | 1723 | 1848 | 1952 |
| P | 43 | (20) | 12.3 | 1554 | 1861 | 1936 | — |
| I | 44 | (20) | 21.9 | 1199 | 1646 | 1772 | — |
| Q | 45 | (16.7) | 10.5 | 1504 | 1749 | 1808 | 1851 |
| R | 46 | (3.7) | 17.3 | 909 | 1451 | 1614 | 1678 |
| P | 47 | (20) | 12.3 | 1483 | 1718 | 1778 | 1781 |
| S | 48 | (10.7) | 14.5 | 1055 | 1476 | 1660 | 1752 |
| R | 49 | (3.7) | 17.3 | 747 | 1331 | 1554 | 1652 |
| T | 50 | MPD-I (5) | 9.5 | 970 | 1331 | 1430 | 1485 |
| U | 51 | (5) | 14.1 | 923 | 1286 | 1372 | 1408 |
| V | 52 | (10) | 10.8 | 1004 | 1302 | 1372 | 1419 |
| W | 53 | (10) | 20.2 | 724 | 1234 | 1462 | 1602 |

Examples 54–73

In these examples, a variety of pulps were combined with natural rubber (NR) to make compositions of this invention. Initially, the pulps were compounded as a concentrate at a concentration of 30 parts of pulp in 100 parts of NR. The concentrate was compounded at a concentration of 8.71 parts of the concentrate in 93.29 parts of NR. The ultimate composition was evaluated against a control by compounding it at a concentration of 2 parts of the pulp in 100 parts of NR and determining the tensile modulus of the compounded material at several elongations. The elastomer matrix used for these examples is shown in Table XI.

TABLE XI

| Ingredient | Function | Parts (wt) |
|---|---|---|
| RSS #1 | Natural rubber | 93.29 |
| Pulp Concentration | Fiber reinforcement | 8.71 |
| Zinc Oxide | Activator | 8 |
| Stearic Acid | Process aid | 1.5 |
| Agerite Resin D | Stabilizer | 1.5 |
| Permanox 6PPD | Stabilizer | 1.5 |
| Circo Light Oil | Process aid | 2 |
| FEF N550 | Carbon black | 30 |
| 80% Insol. Sulfur | Curative | 4.5 |
| BBTS | Accelerator | 1 |

Table XII identifies the pulp by additive quantity and surface area and reports the tensile modulus for the several compositions. It can be noted that the compounded compositions of this invention nearly always exhibit tensile moduli that are significantly higher than moduli of the control.

TABLE XII

| Code | Example No. | 2nd polymer (wt %) | Surface Area ($m^2$/g) | Moduli (psi) at % Elongation | | | |
|---|---|---|---|---|---|---|---|
| | | | | 10 | 30 | 50 | 100 |
| B | 54C | None | 9.0 | 131 | 392 | 581 | 668 |
| J | 55 | PVP (3.7) | 10.4 | 392 | 755 | 885 | 987 |
| K | 56 | (20) | 18.3 | 392 | 856 | 1045 | 1176 |
| L | 57 | (16.7) | 22.0 | 581 | 929 | 1089 | 1248 |
| M | 58 | (10.7) | 8.8 | 392 | 755 | 885 | 929 |
| I | 59 | (20) | 21.9 | 493 | 885 | 1060 | 1176 |
| N | 60 | (10.7) | 19.5 | 769 | 1030 | 1132 | 1248 |
| K | 61 | (20) | 18.3 | 435 | 798 | 1060 | 1234 |
| O | 62 | (16.7) | 16.6 | 392 | 769 | 943 | 1045 |
| P | 63 | (20) | 12.3 | 479 | 914 | 1074 | 1176 |
| I | 64 | (20) | 21.9 | 435 | 914 | 1147 | 1306 |

TABLE XII-continued

| Code | Example No. | 2nd polymer (wt %) | Surface Area ($m^2$/g) | Moduli (psi) at % Elongation | | | |
|---|---|---|---|---|---|---|---|
| | | | | 10 | 30 | 50 | 100 |
| Q | 65 | (16.7) | 10.5 | 421 | 827 | 1001 | 1045 |
| R | 66 | (3.7) | 17.3 | 145 | 406 | 842 | 1001 |
| P | 67 | (20) | 12.3 | 232 | 639 | 1045 | 1161 |
| S | 68 | (10.7) | 14.5 | 160 | 392 | 784 | 1001 |
| R | 69 | (3.7) | 17.3 | 218 | 581 | 900 | 1030 |
| T | 70 | MPD-I (5) | 9.5 | 189 | 522 | 769 | 856 |
| U | 71 | (5) | 14.1 | 102 | 305 | 653 | 885 |
| V | 72 | (10) | 10.8 | 160 | 406 | 682 | 798 |
| W | 73 | (10) | 20.2 | 232 | 624 | 827 | 914 |

What is claimed is:

1. A composition comprising:

20 to 99 weight percent elastomer and 1 to 80 weight percent fibrous, polymeric, pulp uniformly combined therewith wherein the fibrous pulp is a uniform combination of at least two organic polymeric materials and has a surface area of greater than 6 $m^2$/g.

2. The composition of claim 1 wherein one organic polymeric material of the pulp is para-aramid.

3. The composition of claim 2 wherein the para-aramid organic polymeric material of the pulp is poly(p-phenylene terephthalamide).

4. The composition of claims 1, 2, or 3 wherein the organic polymeric materials in the pulp are soluble and mutually immiscible in sulfuric acid.

5. The composition of claims 1, 2, or 3 wherein the pulp is a refined fiber floc.

6. The composition of claim 1 wherein the pulp includes poly(p-phenylene terephthalamide) and at least one other organic polymeric material selected from the group consisting of poly(m-phenylene isophthalamide), cycloaliphatic polyamide, aliphatic polyamide, and polyvinylpyrrolidone.

7. The composition of claim 1 wherein the fibrous pulp has a surface area of greater than 8 $m^2$/g.

* * * * *